US010152296B2

(12) United States Patent
Trestain

(10) Patent No.: US 10,152,296 B2
(45) Date of Patent: Dec. 11, 2018

(54) APPARATUS AND METHOD FOR PROVIDING A PERSONALIZED BASS TACTILE OUTPUT ASSOCIATED WITH AN AUDIO SIGNAL

(71) Applicant: Harman International Industries, Incorporated, Stamford, CT (US)

(72) Inventor: Christopher Michael Trestain, Livonia, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/864,401

(22) Filed: Jan. 8, 2018

(65) Prior Publication Data

US 2018/0181368 A1    Jun. 28, 2018

Related U.S. Application Data

(60) Provisional application No. 62/439,699, filed on Dec. 28, 2016.

(51) Int. Cl.
*H04B 1/00* (2006.01)
*G06F 3/16* (2006.01)
(Continued)

(52) U.S. Cl.
CPC ............. *G06F 3/165* (2013.01); *H04R 1/028* (2013.01); *H04R 3/04* (2013.01); *H04R 29/001* (2013.01);
(Continued)

(58) Field of Classification Search
CPC ........... G06F 3/165; H04R 1/028; H04R 3/04; H04R 29/001
See application file for complete search history.

(56) References Cited

U.S. PATENT DOCUMENTS 3,674,945 A    7/1972   Hands
4,064,376 A    12/1977  Yamada
(Continued)

FOREIGN PATENT DOCUMENTS

EP      3039880        6/1962
WO      9962295        12/1999
WO      2017196666 A1  11/2017

OTHER PUBLICATIONS

Professor Hatton, Industry Analysis: Wearable Technology, May 16, 2014, 71 pages, US.
(Continued)

*Primary Examiner* — Simon King
(74) *Attorney, Agent, or Firm* — Brooks Kushman P.C.

(57) ABSTRACT

In at least one embodiment, an apparatus for providing a tactile output associated with an audio output is provided. The apparatus includes a head unit that is coupled to a plurality of tactile transducers with each tactile transducer being positioned in a seat of a vehicle. The head unit is configured to receive a command indicative of a desired tactile feedback for a seat of the vehicle, the desired tactile feedback is associated with an audio output that is played back by one or more speakers in the vehicle. The head unit is further configured to transmit a control signal indicative of the desired tactile feedback to be provided by a tactile transducer in the seat of the vehicle such that the tactile transducer generates the desired tactile feedback at the seat while the one or more speakers in the vehicle playback the audio output.

20 Claims, 3 Drawing Sheets

(51) Int. Cl.
    *H04R 1/02* (2006.01)
    *H04R 29/00* (2006.01)
    *H04R 3/04* (2006.01)

(52) U.S. Cl.
    CPC ...... *H04R 2400/03* (2013.01); *H04R 2499/13* (2013.01)

(56) References Cited

U.S. PATENT DOCUMENTS

| | | | |
|---|---|---|---|
| 4,136,685 A | 1/1979 | Ramey | |
| 4,354,067 A | 10/1982 | Yamada et al. | |
| 4,807,294 A | 2/1989 | Iwata et al. | |
| 5,060,527 A | 10/1991 | Burgess | |
| 5,388,992 A | 2/1995 | Franklin et al. | |
| 5,424,592 A | 6/1995 | Bluen et al. | |
| 5,553,148 A | 9/1996 | Werle | |
| 5,565,840 A | 10/1996 | Thorner et al. | |
| 5,624,155 A | 4/1997 | Bluen et al. | |
| 5,780,958 A | 7/1998 | Strugach et al. | |
| 5,866,836 A | 2/1999 | Bergstrom | |
| 6,004,209 A | 12/1999 | Katsumoto et al. | |
| 6,023,515 A | 2/2000 | McKee et al. | |
| 6,044,159 A | 3/2000 | Schmertmann et al. | |
| 6,075,868 A | 6/2000 | Goldfarb et al. | |
| 6,116,091 A | 9/2000 | Tran et al. | |
| 6,230,139 B1 | 5/2001 | Hara et al. | |
| 6,422,941 B1 | 7/2002 | Thorner et al. | |
| 6,610,917 B2 | 8/2003 | Ludwig | |
| 6,626,341 B2 | 9/2003 | Mitchell | |
| 6,694,035 B1 | 2/2004 | Teicher et al. | |
| 6,698,036 B2 | 3/2004 | Armbruster et al. | |
| 6,712,249 B2 | 3/2004 | Magnusson et al. | |
| 6,752,716 B1 | 6/2004 | Nishimura et al. | |
| 7,129,824 B2 | 10/2006 | Cranfill et al. | |
| 7,194,099 B2 | 3/2007 | Lewis | |
| 7,285,101 B2 | 10/2007 | Tumey | |
| 7,324,655 B2 | 1/2008 | Sato | |
| 7,418,108 B2 | 8/2008 | Oser | |
| 7,421,088 B2 | 9/2008 | Cranfill et al. | |
| 7,422,564 B2 | 9/2008 | Parsons et al. | |
| 7,440,581 B2 | 10/2008 | Wiener | |
| 7,553,288 B2 | 6/2009 | Cohen | |
| 7,688,992 B2 | 3/2010 | Aylward et al. | |
| 7,753,163 B2 | 7/2010 | Bouchard | |
| 7,798,982 B2 | 9/2010 | Zets et al. | |
| 7,821,493 B2 | 10/2010 | Tierling et al. | |
| 7,981,064 B2 | 7/2011 | Oser et al. | |
| 8,027,491 B2 | 9/2011 | LeDonne | |
| 8,036,414 B2 | 10/2011 | French et al. | |
| 8,045,743 B2 | 10/2011 | Aylward et al. | |
| 8,077,884 B2 | 12/2011 | Oser et al. | |
| 8,103,017 B2 | 1/2012 | Nakagaki | |
| 8,139,803 B2 | 3/2012 | Afshar | |
| 8,221,246 B2 | 7/2012 | Lee et al. | |
| 8,308,558 B2 | 11/2012 | Thorner | |
| 8,317,734 B1 | 11/2012 | Redfield | |
| 8,398,569 B1 | 3/2013 | Mortimer et al. | |
| 8,414,373 B2 | 4/2013 | Bone et al. | |
| 8,520,866 B2 | 8/2013 | Linjama | |
| 8,617,089 B2 | 12/2013 | Oser et al. | |
| 8,638,966 B2 | 1/2014 | Taylor et al. | |
| 8,644,519 B2 | 2/2014 | Pance et al. | |
| 8,668,045 B2 | 3/2014 | Cohen | |
| 8,717,152 B2 | 5/2014 | Bhatia et al. | |
| 8,761,417 B2 | 6/2014 | Oser et al. | |
| 8,804,093 B2 | 8/2014 | Haight et al. | |
| 8,811,648 B2 | 8/2014 | Pance et al. | |
| 8,816,873 B2 | 8/2014 | Bisset et al. | |
| 8,942,410 B2 | 1/2015 | Wilk et al. | |
| 8,965,028 B2 | 2/2015 | Oishi et al. | |
| 8,965,032 B2 | 2/2015 | Wolfe | |
| 8,977,376 B1 | 3/2015 | Lin et al. | |
| 8,995,692 B2 | 3/2015 | Efrati | |
| 9,064,387 B2 | 6/2015 | Bhatia et al. | |
| 9,088,839 B2 | 7/2015 | Kohn et al. | |
| 9,139,135 B2 | 9/2015 | Assaf | |
| 9,185,492 B2 | 11/2015 | Afshar | |
| 9,247,342 B2 | 1/2016 | Croft, III | |
| 9,282,409 B2 | 3/2016 | Lee | |
| 9,294,841 B2 | 3/2016 | Sahyoun | |
| 9,354,704 B2 | 5/2016 | Lacroix et al. | |
| 9,384,639 B2 | 7/2016 | White | |
| 9,402,133 B2 | 7/2016 | Seiler | |
| 9,430,921 B2 | 8/2016 | Biggs | |
| 9,448,626 B2 | 9/2016 | Cruz-Hernandez et al. | |
| 9,461,529 B2 | 10/2016 | Efrati | |
| 9,606,627 B2 | 3/2017 | Bhatia et al. | |
| 9,609,421 B2 | 3/2017 | Oishi et al. | |
| 9,621,973 B2 | 4/2017 | Stauber et al. | |
| 9,648,412 B2 | 5/2017 | Timothy et al. | |
| 9,672,703 B2 | 6/2017 | Alexiou et al. | |
| 2004/0155512 A1 | 8/2004 | Nakamura | |
| 2005/0053252 A1 | 3/2005 | Cohen | |
| 2007/0217644 A1 | 9/2007 | LeDonne | |
| 2011/0251535 A1 | 10/2011 | Bender | |
| 2011/0257468 A1 | 10/2011 | Oser et al. | |
| 2012/0035513 A1 | 2/2012 | Afshar | |
| 2012/0051579 A1 | 3/2012 | Cohen | |
| 2013/0005214 A1 | 1/2013 | Davies | |
| 2013/0202134 A1 | 8/2013 | Afshar | |
| 2015/0146892 A1 | 5/2015 | Watanabe | |
| 2015/0360608 A1* | 12/2015 | Tzirkel-Hancock | B60Q 9/00 297/217.1 |
| 2016/0150313 A1* | 5/2016 | Howard | H04R 1/2803 381/71.4 |
| 2017/0164116 A1 | 6/2017 | Alexiou et al. | |
| 2017/0325039 A1 | 11/2017 | Khwaja et al. | |

OTHER PUBLICATIONS

Website https://www.idc.com/getdoc.jsp?containerId=prUS42818517 IDC Media Center, Worldwide Wearables, Jun. 21, 2017, Retrieved from the Internet Mar. 5, 2018, 4 pages, Framingham, Massachusetts, US.

Website http://www.nielsen.com/us/en/insights/news/2014/tech-styles-are-consumers-really-interested-in-wearing-tech-on-their-sleeves.html Nielsen, Media, Tech-Styles, Mar. 20, 2014, Retrieved from the Internet Mar. 5, 2018, 4 pages, US.

Website http://www.dailymail.co.uk/sciencetech/article-3387733/Forget-going-club-380-backpack-uses-bone-conduction-technology-let-FEEL-bass-music.html Ellie Zolfagharifard, Daily Mail, M2 Backpack, Jan. 6, 2016, Retrieved from the Internet Mar. 8, 2018, 3 pages, Las Vegas, Nevada, US.

Website http://subpac.com/ Subpac.com, Jan. 1, 2017, Retrieved from the Internet Apr. 9, 2018, 4 pages, US.

Website https://www.kickstarter.com/projects/311239538/subpac-portable-tactile-audio-technology Studiofeed, Kickstarter, Portable Tactile audio Technology, Jan. 1, 2018, Retrieved from the Internet Mar. 5, 2018, 14 pages, US.

Website https://us.lofelt.com/products/basslet LOFELT, Basslet, Watch-size Subwoofer, Jan. 1, 2018, Retrieved from the Internet Mar. 5, 2018, 10 pages, US.

Website https://www.wareable.com/wearable-tech/subpac-ceo-todd-chernecki-interview Michael Sawh, Wearable Feature, Todd Chernecki, SubPac CEO, Jul. 11, 2016, Retrieved from the Internet Mar. 8, 2018, 9 pages, US.

Website https://www.woojer.com/ Woojer, Gaming Vest, Jan. 1, 2018, Retrieved from the Internet Mar. 5, 2018, 3 pages, US.

Website https://www.kickstarter.com/projects/kor-fx/kor-fx-gaming-vest-4dfx-haptic-feedback-system Kickstarter, Kor-FX Gaming Vest, Jan. 1, 2018, Retrieved from the Internet Mar. 5, 2018, 3 pages, US.

Website https://bassaware.com/collections/all Bassaware, Jan. 1, 2018, Retrieved from the Internet Mar. 5, 2018, 1 page, US.

Website https://www.wareable.com/wearable-tech/haptic-wearable-tactile-alerts-alarms-navigation-2618 Sophie Charara, Wearable News, Haptic Wearable, Apr. 21, 2016, Retrieved from the Internet Mar. 8, 2018, 5 pages, US.

Website https://wearmoment.com/about Wear Moment, Somatic Labs, Jan. 1, 2018, Retrieved from the Internet Mar. 5, 2018, 4 pages, US.

(56) References Cited

OTHER PUBLICATIONS

Website https://www.parts-express.com/brand/buttkicker/511 Parts Express, ButtKicker, Jan. 1996-2018, Retrieved from the Internet Mar. 5, 2018, 725 Pleasant Valley Dr. Springboro, OH 45066, 3 pages, US.
Website http://www.guitammer.com/core-products-techonology The Guitammer Company, Core Products Technology, ButtKicker, Jan. 1, 2012, Retrieved from the Internet Mar. 8, 2018, 2 pages, US.
Website http://soundshaker.com/ SoundShaker, 2015, Jan. 1, 2015, Retrieved from the Internet Mar. 5, 2018, 7 pages, US.
Website http://tremorfx.com/ Tremor FX, Jan. 2011-2017, Retrieved from the Internet Mar. 5, 2018, 8 pages, US.
Website http://clarksynthesis.com/clark-synthesis-products/tactile-sound-transducers/ Clark Synthesis, Inc., Tactile Sound Transducers, Jan. 1, 2018, Retrieved from the Internet Mar. 5, 2018, 2 pages, US.
Deborah Weinswig, Fung Global Retail & Technology, Wearables Report, Jun. 21, 2016, 26 pages, US.
Ericsson Consumerlab, Wearable Technology and the Internet of Things, Jan. 1, 2016, 12 pages, 2016, SE-164 80 Stockholm, Sweden.
Website https://subpac.zendesk.com/hc/en-us/articles/203684355-Can-I-use-a-SubPac-with-a-pacemaker-or-other-internal-devices-SubPac, Internal Devices, Jan. 1, 2015, Retrieved from the Internet Mar. 6, 2018, 1 page, US.
PricewaterhouseCoopers LLP, The Wearable Future, Oct. 8, 2014, 50 pages, US.
Abdulmotaleb El Saddik, Mauricio Orozco, Mohamad Eid, Jongeun Cha, Haptics Technologies: Bringing Touch to Multimedia, Google Books, 2.5 Media, p. 33, Jan. 1, 2011, US.
Website http://mixmag.net/read/subpac-introduces-movie-theatres-to-sounds-you-can-feel-news Sydney Megan Jow, MixMag, Sep. 20, 2016, Retrieved from the Internet Mar. 8, 2018, 4 pages, US.
Website https://reactual.com/audio-equipment/tactile-sound/tactile-transducers.html Justin Thomas, Reactual, Tactile Transducers, Dated Jan. 1, 2016, Retrieved from the Internet Mar. 5, 2018, 8 pages, US.
Website http://www.gmanetwork.com/news/scitech/technology/568519/wearable-tactile-bass-system-lets-you-feel-music/story/ GMA News Online, Jun. 2, 2016, Retrieved from the Internet Mar. 5, 2018, 1 page, US.
Website https://www.crunchbase.com/organization/subpac Crunchbase, SubPac Patent-Pending, Founded 2013, Palo Alto, Announced Jul. 12, 2016, Retrieved from the Internet Mar. 5, 2018, 1 page, California, US.
Website http://www.korfx.com/products Kor-FX Gaming Vest Online Store, Jan. 1, 2014, Retrieved from the Internet Mar. 5, 2018, 3 pages, US.
Website https://www.owler.com/company/thesubpac Owler, SubPac, John Alexiou, Co-Founder & CEO, Jan. 1, 2018, Retrieved from the Internet Apr. 19, 2018. 5 pages, Los Angeles, California, US.
Website https://webcache.googleusercontent.com/search?q=cache:vWQkj7NS_DQJ:https://www.geek.com/news/wearable-bassaware-drop-makes-sure-you-really-feel-the-bass-1634888/+&cd=1&hl=en&ct=clnk&gl=us Wearable Bassware Drop Makes sure you Really Feel the Bass, Ziff Davis, LLC, PCMag Digital Group, Copyright 1996-2018, Retrieved from the Internet Apr. 19, 2018, 16 pages, US.

\* cited by examiner

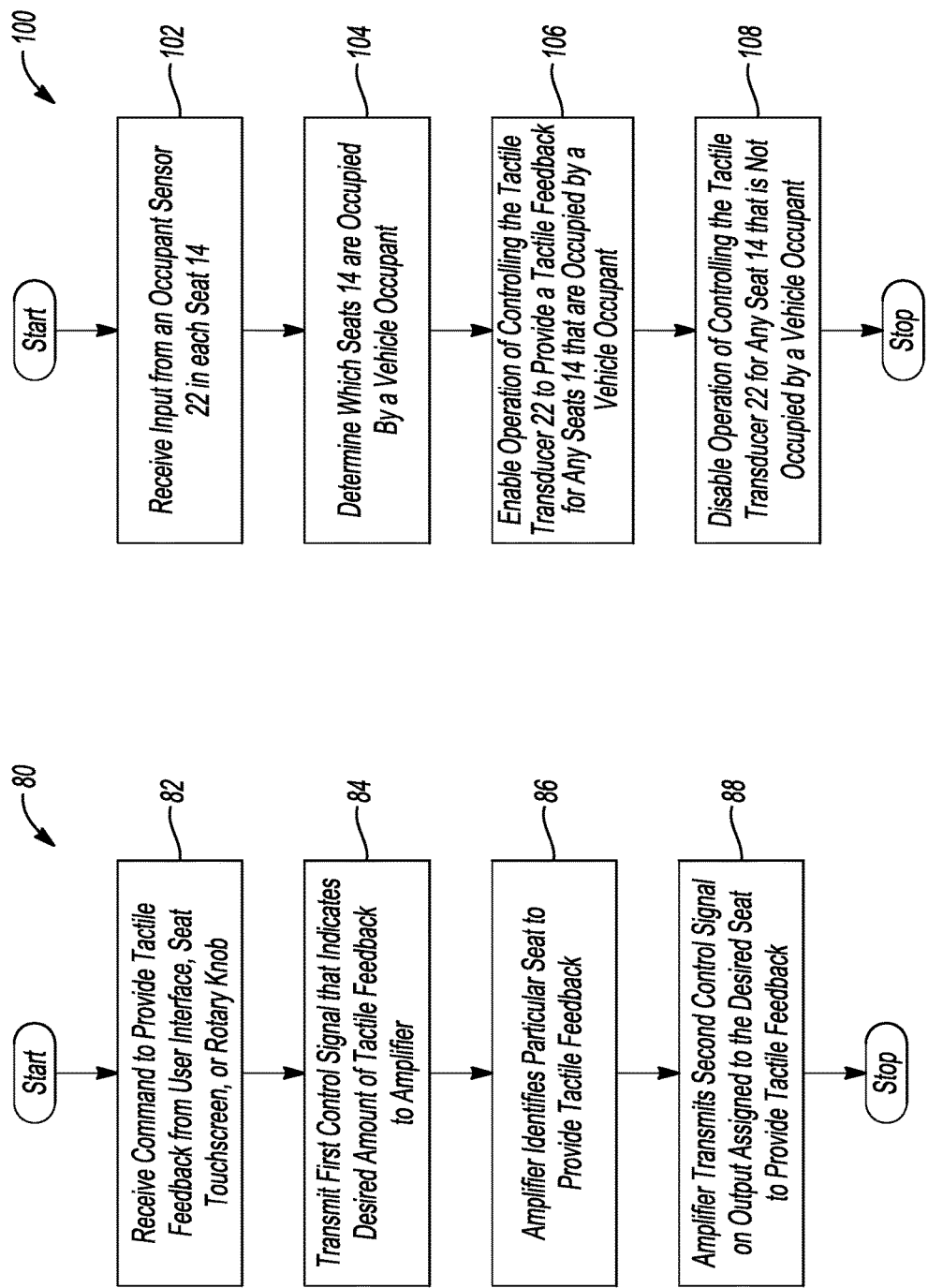

APPARATUS AND METHOD FOR PROVIDING A PERSONALIZED BASS TACTILE OUTPUT ASSOCIATED WITH AN AUDIO SIGNAL

CROSS-REFERENCE TO RELATED APPLICATIONS

This application claims the benefit of U.S. provisional Application No. 62/439,699 filed on Dec. 28, 2016, the disclosure of which is hereby incorporated by reference in its entirety herein.

TECHNICAL FIELD

Aspects disclosed herein generally relate to an apparatus and method for providing a personalized bass tactile output that is associated with an audio signal for users in a vehicle. These aspects and others will be discussed in more detail herein.

BACKGROUND

In current audio systems, bass for an audio output is generally set for an entire listening room. This type of blanket approach with respect to setting the bass fails to account for each user's audio preferences with respect to the bass settings of the audio output. For example, various users or listeners of the audio output may desire a certain tactile feel with respect to the bass associated with the audio output. Current audio systems fail to provide this tactile feedback on an individualized basis with respect to the bass of the audio output.

SUMMARY

In at least one embodiment, an apparatus for providing a tactile output associated with an audio output is provided. The apparatus includes a head unit that is operably coupled to a plurality of tactile transducers with each tactile transducer being positioned in a seat of a vehicle. The head unit is configured to receive a first command indicative of a first desired tactile feedback for a first seat of the vehicle, the first desired tactile feedback is associated with an audio output that is played back by one or more speakers in the vehicle. The heat unit is further configured to transmit a first control signal indicative of the first desired tactile feedback to be provided by a first tactile transducer in the first seat of the vehicle such that the first tactile transducer generates the first desired tactile feedback at the first seat while the one or more speakers in the vehicle playback the audio output.

In at least another embodiment, a computer-program product embodied in a non-transitory computer read-able medium that is programmed for providing a tactile output associated with an audio output with a plurality of tactile transducers is provided. Each tactile transducer is positioned in a seat of a vehicle. The computer-program product includes instructions for receiving a first command indicative of a first desired tactile feedback for a first seat of the vehicle, the first desired tactile feedback being associated with an audio output that is played back by one or more speakers in the vehicle. The computer-program product further includes instructions for transmitting a first control signal indicative of the first desired tactile feedback to be provided by a first tactile transducer in the first seat of the vehicle such that the first tactile transducer generates the first desired tactile feedback at the first seat while the one or more speakers in the vehicle playback the audio output.

In at least another embodiment, an apparatus for providing a tactile output associated with an audio output is provided. The apparatus includes a tactile transducer configured to be positioned in a seat of a vehicle to provide a tactile feedback associated with an audio output that is played back by one or more speakers in the vehicle. The tactile transducer is further configured to be operably coupled to a head unit that receives a command indicative of a desired tactile feedback for the seat and that transmits a control signal indicative of desired tactile feedback to be provided by the tactile transducer.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 3 generally depicts a method for providing a personalized bass tactile output for a user in accordance to one embodiment; and FIG. 4 generally depicts a method for determining an occupant in vehicle seats for controlling the tactile bass transducer based on whether the occupant is positioned on the seats in accordance to one embodiment.

DETAILED DESCRIPTION

Figure 1:
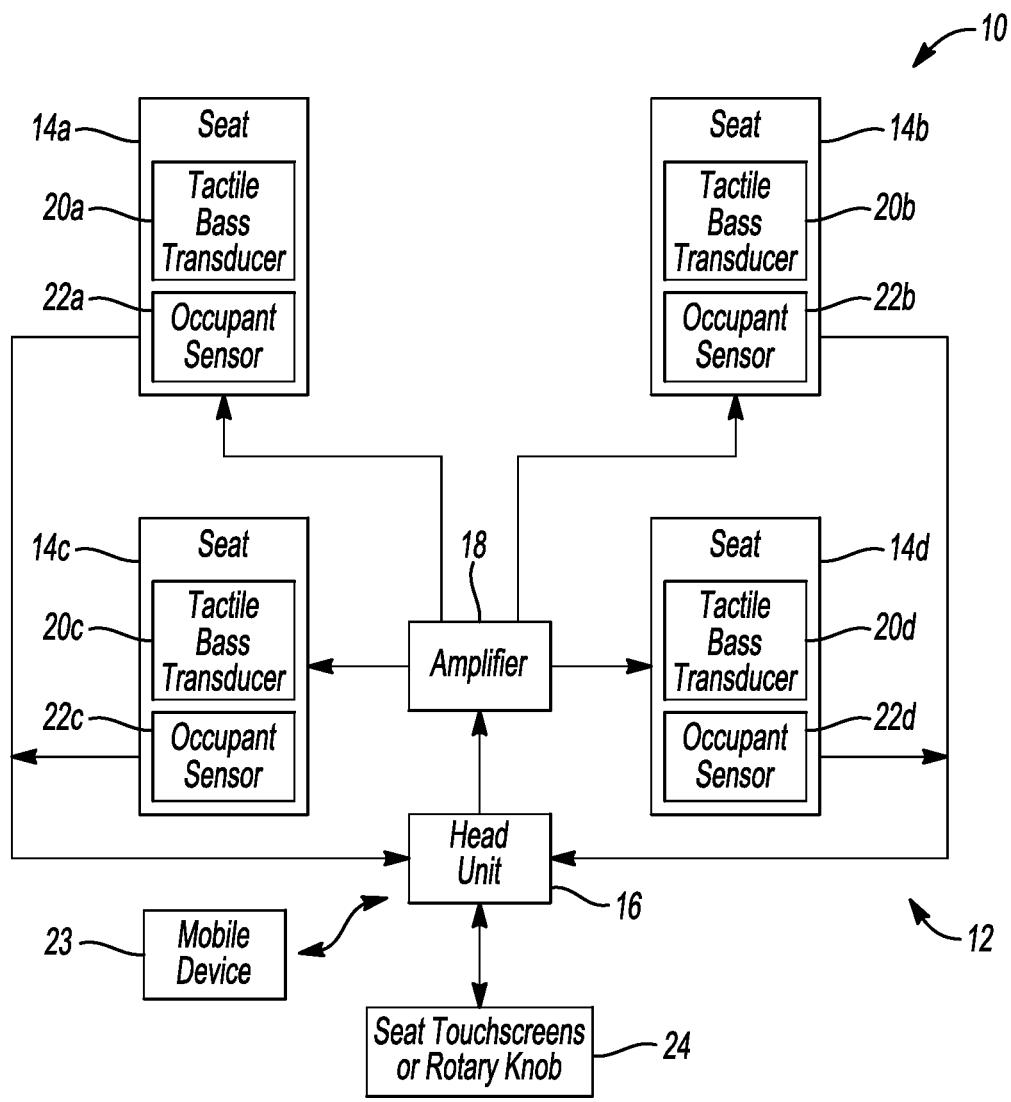
FIG. 1 generally depicts a vehicle including an apparatus for providing a personalized bass tactile output for a user in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controller(s) utilize one or more microprocessors to execute a computer-program that is embodied in a non-transitory computer readable medium that is programmed to perform any number of the functions as disclosed. Further, the controller(s) as provided herein includes a housing and various number of microprocessors, integrated circuits, and memory devices ((e.g., FLASH, random access memory (RAM), read only memory (ROM), electrically programmable read only memory (EPROM), electrically erasable programmable read only memory (EE- PROM)) positioned within the housing. The controller(s) as disclosed also include hardware based inputs and outputs for receiving and transmitting data, respectively from and to other hardware based devices as discussed herein.

An apparatus and method for providing a personalized bass tactile output that is associated with an audio signal for users in a vehicle is disclosed herein. The apparatus and method may enable a user the ability to select a corresponding bass tactile feedback associated with an audio output signal in a vehicle listening environment. This creates a better user experience for the user. In addition to the audio bass experience, each seat in the vehicle can tailor their tactile bass experience. Therefore, a user who likes to feel their seats rumble excessively can set the bass tactile level accordingly. Conversely, a user who desires a lesser physical experience can set their bass tactile level accordingly.

Specifically, a tactile transducer (or puck) may be installed in each seating location in the vehicle. The tactile transducer can be installed either in the back or under the seat or a combination of both. It may be advantageous to attach the tactile transducer to the seat frame so that the tactile feed (or vibration) is evenly distributed on the frame. The seat mounting locations may be physically separated from one another to prevent disturbance to other users (or passengers) in the vehicle. An example of this may include bench seating. The tactile transducer may provide little to no audible output. Specifically, the tactile transducer may provide the sensation to the passenger that more bass (or low frequency) is present in the audio output by virtue of the presence of the tactile output.

The tactile output of the tactile transducer may be tuned to compliment the audio system. During the tuning operation, a user may sit in the vehicle while the audio system outputs tones at various bass frequencies (e.g., 20-70 Hz) so that the frequencies provide the same amount of vibration. The tuning operation may be performed with an accelerometer.

The user can control the amount of vibration (or tactile feedback) provided by the tactile transducer for a low frequency signal that is in the range of 20-70 Hz. It is contemplated that the tactile transducer may enable the user to control the tactile feedback for higher or lower frequencies than the foregoing range based on the overall tuning of system. The apparatus provides adjustable tactile control for each tactile transducer that is located at a corresponding seat (i.e., personalization). An amplifier may be provided for each tactile transducer to provide gain control for the tactile output provided by the tactile transducer. For gain control, this aspect corresponds to a correlation between volume control and the tactile feedback. If there is more gain applied (i.e., more volume being applied), then the tactile transducer provides more vibrations. If there is less gain applied (i.e., less volume being applied), then the tactile transducer provides less vibrations. Various switching devices such as physical knobs positioned proximate to a seat, mobile devices, individualized touch screens, or a user interface on a head unit may enable the user to control the amount of tactile feedback provided by the tactile transducer. The tactile transducer in a corresponding seat will remain deactivated in the event a passenger is not detected (i.e., no one is sitting in the seat). In this case, the head unit may be operably coupled to an occupant sensor that is positioned in each seat of the vehicle. The head unit may simply deactivate the tactile transducer in response to the occupant sensor failing to detect a passenger in the corresponding seat. This may minimize power consumption for the vehicle and provide overall electrical efficiency of the system.

FIG. 1 generally depicts a vehicle 10 including an apparatus 12 for providing a personalized tactile output (or feedback) for a user in accordance to one embodiment. The vehicle 10 generally includes a plurality of seats 14a-14d ("14") positioned within an interior cabin thereof. It is recognized that the number of seats positioned within the vehicle 10 may vary based on the desired criteria of a particular application. The apparatus 12 generally includes a head unit (or audio controller), an amplifier 18, and a plurality of tactile transducers 20a-20d ("20"). Each tactile transducer 20 is generally configured to provide a tactile feedback that corresponds to lower frequency signals that are present on an audio output signal (or audio output) provided by various speakers 21 positioned throughout the vehicle 10. The head unit 16 may provide the audio output for playback by the speakers 21. The head unit 16 associates the corresponding audio output with the selected bass tactile feedback. Alternatively, the head unit 16 may receive the audio output from another controller positioned in the vehicle 10 and associate the corresponding audio output with the selected bass tactile feedback.

The tactile feedback may be in the form of vibrations to enable the user to feel the sensation of the low frequency portions on the audio output signal. Each tactile transducer 20 may be implemented, for example, as a PUCK tactile transducer mini bass shaker (or "bass shaker") as provided by Dayton Audio having a place of business at 705 Pleasant Valley Dr., Springboard, Ohio 45066. The head unit 16 includes a user interface (not shown) to enable a user to independently control the amount of tactile feedback each tactile transducer 20 provides for a given user (or occupant). For example, the seat 14a may correspond to a front driver side seat, the seat 14b may correspond to a front passenger side seat, the seat 14c may correspond to a rear left passenger seat, and the seat 14d may correspond to a rear right passenger seat. A user may separately control the amount of tactile feedback provided at the front driver side seat 14a, the front passenger side seat 14b, the rear left passenger seat 14c, and the rear right passenger seat 14d via a user interface on the head unit 16. In this case, the amplifier 18 provides a separate channel or output to each corresponding seat 14a-14d to enable independent control of the tactile transducer 20.

Additionally or alternatively, any number of mobile devices 23 may be operably coupled to the head unit 16 and control the amount of tactile feedback provided by the corresponding tactile transducer 20. For example, the mobile device 23 may communicate via Bluetooth® or other suitable wireless communication protocol with the head unit 16 to control the amount of tactile feedback provided by the tactile transducer 20. The mobile device 23 may be a cell phone, iPad® tablet, laptop, etc. The mobile device 23 may include an application that is executed by at least one controller thereon that provides a user interface and which further provides the user the option to select the amount of tactile feedback provided by the tactile transducer 20 for a particular seat 14a-14d. Specifically, if the occupant is positioned on the rear right passenger seat 14d, the occupant can input the desired amount of tactile feedback provided by the tactile transducer 20d that is mounted to the rear right passenger seat 14d.

Additionally or alternatively, individual touch screens (or physical knobs) 24a-24d ("24") may be positioned proximate to each seat 14 for controlling the amount of tactile feedback provided by the tactile transducer 20 for that given seat 14. For example, the individual touch screen (or physical knob) 24d may be positioned proximate to the rear right passenger seat 14d to enable the occupant positioned on the rear right passenger seat 14d to select the amount of tactile feedback that is provided by the tactile transducer 20d. In general, each tactile transducer 20 may be mounted or installed either in a back side of the seat 14 or under the seat 14. Each tactile transducer 20 may be coupled directly to a seat frame of the seat 14 to enhance the tactile effect (or the vibrational effect) of the tactile transducer 20. The seat frame may evenly distribute the vibrations of the tactile transducer 20 across the seat 14. It is desirable to package each tactile transducer 20 in a different mounting location to avoid tactile crosstalk or vibrations from the seats 14 to interfere with one another. Each tactile transducer 20 provides little to no audible output. Rather, the tactile transducer 20 provides vibrations corresponding to the low frequencies (e.g., 20-70 Hz) present in an audio output signal in the seat 14. It is recognized that the tactile transducer 20 may provide vibrations for frequencies lower than 20 Hz or for frequencies greater than 70 Hz.

Each seat 14a-14d may also include a corresponding occupant sensor 22a-22d (or 20), respectively. In general, the occupant sensor 22 provides an output indicative of whether an occupant is seated in the seat 14 to the head unit 16. The head unit 16 is configured to disable the tactile feedback operation of the tactile transducer 20 when an occupant is not positioned in a corresponding seat 14. This operation may preserve energy consumption and optimize electrical efficiency particularly for hybrid and electric vehicles.

Figure 2:
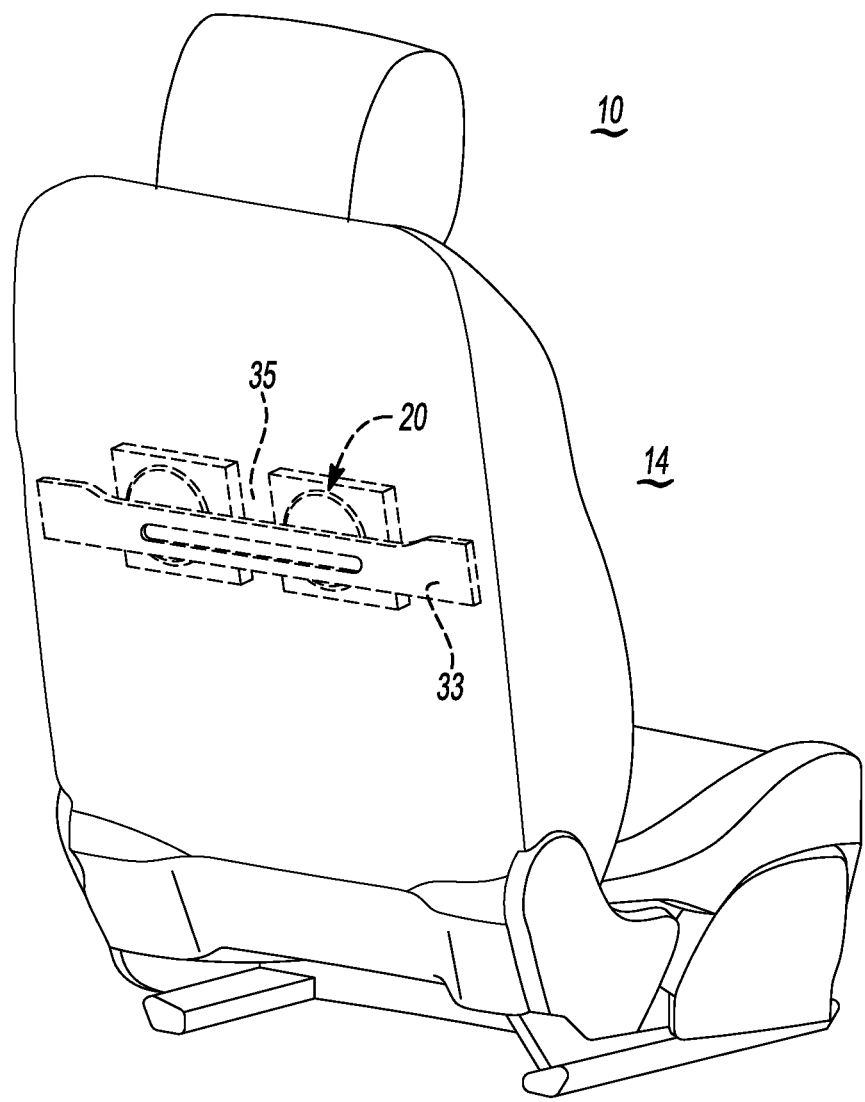
FIG. 2 generally depicts one example of the manner in which two tactile transducers are provided in a seat in the vehicle in accordance to one embodiment.

FIG. 2 generally depicts one example of the manner in which two tactile transducers 20 are provided in the seat 14 in the vehicle 10 in accordance to one embodiment. As can be seen, each tactile transducer 20 is mounted directly to a frame 33 of the seat 14 so that the tactile feed (or vibration) is evenly distributed on the frame 33 to enhance the effect. In addition, a gap 35 may be provided between each transducer 20 such the transducers 20 avoid any cross talk with one another to mitigate excessive or undesired rattles or buzzing.

FIG. 3 generally depicts a method 80 for providing a personalized bass tactile output for a user in accordance to one embodiment.

In block 82, the head unit 16 receives a command from the user interface (positioned on the head unit 16), the mobile device 23, or the seat touchscreens (or rotary knobs) 24 to activate the tactile transducer 20 to provide the tactile feedback for the user at the desired seat 14.

In block 84, the head unit 16 transmits a first control signal to the amplifier 18. The first control signal is indicative of the desired tactile feedback to be provided by tactile transducer 20 and the corresponding seat 14 that is selected by the occupant. For example, the user may input a desired "intensity" into the head unit 16 that corresponds to a desired amount of vibration that the tactile transducer 20 is to produce. The overall range of the intensity selected by the user at the head unit 16 may vary from a subtle vibration to an intense vibration. In the event the user selects a subtle vibration, the tactile transducer 20 may vibrate a small amount for low frequencies within the audio output. In the event the user selects an intense vibration, the tactile transducer 20 may vibrate at a high amount for low frequencies within the audio output. The user can also deactivate (i.e., turn off) the tactile transducer 20 to avoid generating the vibration for the audio output via the head unit 16. The head unit 16 may be arranged to activate (i.e., turn on) or deactivate the tactile feedback (or vibration) of the tactile transducer 20.

Additionally or alternatively, the tactile transducer 20 may be controlled by the user to provide a soft/subtle force for low frequencies or to provide an intense force for low frequencies based on the user's selection. An overall excursion of the tactile transducer 20 may change based on the user's input which impacts the force (and/or vibrations) of the tactile transducer 20.

In block 86, the amplifier 18 receives the first control signal and identifies the particular seat 14 that is selected to provide the tactile feedback by the tactile transducer 20 in response to the first control signal.

In block 88, the amplifier 18 transmits a second control signal to the selected or desired seat 14 on an output that is assigned to the desired seat 14 so that the tactile transducer 20 that is mounted to the desired seat 14 provides the tactile feedback as requested by the occupant.

FIG. 4 generally depicts a method 100 for detecting an occupant in the seats 14 and for controlling the tactile transducer 20 based on whether the occupant is positioned in the seats 14 in accordance to one embodiment.

In block 102, the head unit 16 receives an input from each occupant sensor 22 positioned in a corresponding seat 14.

In block 104, the head unit 16 determines which seats 14 are occupied by an occupant in response to the inputs from the occupant sensors 22.

In block 106, the head unit 16 enables the operation of controlling the tactile feedback for any corresponding seat 14 that is detected to have a vehicle occupant. For example, in the event the front passenger side seat 14b is detected to be occupied by a vehicle occupant, the head unit 16 enables a user to activate the tactile transducer 20b of the front passenger side seat 14b in order to provide the tactile feedback for the vehicle occupant.

In block 108, the head unit 16 disables the operation of controlling the tactile feedback for any corresponding seat 14 that is detected to not include a vehicle occupant. For example, in the event the front passenger side seat 14b is detected to not include the vehicle occupant, the head unit 16 prevents the user from activating the tactile transducer 20b of the front passenger side seat 14b irrespective of where the input comes from (i.e., from the user interface on the head unit 16, the mobile device 23, or the seat touch screen or rotary knobs). As noted above, this condition optimizes the overall efficiency of the electrical system particularly for hybrid and electrical vehicles and minimizes energy consumption.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for providing a tactile output associated with an audio output, the apparatus comprising:
   a head unit being operably coupled to a plurality of tactile transducers, each tactile transducer being positioned in a seat of a vehicle, the head unit being configured to:
   receive a first command indicative of a first desired tactile feedback for a first seat of the vehicle, the first desired tactile feedback being associated with an audio output that is played back by one or more speakers in the vehicle; and transmit a first control signal indicative of the first desired tactile feedback to be provided by a first tactile transducer in the first seat of the vehicle such that the first tactile transducer generates the first desired tactile feedback at the first seat while the one or more speakers in the vehicle playback the audio output.

2. The apparatus of claim 1 wherein the head unit is further configured to receive a second command indicative of a second desired tactile feedback for a second seat of the vehicle, the second desired tactile feedback being associated with the audio output that is played by the one or more speakers in the vehicle.

3. The apparatus of claim 2 wherein the head unit is further configured to transmit a second control signal indicative of the second desired tactile feedback to be provided by a second tactile transducer in the second seat of the vehicle such that the second tactile transducer generates the desired second tactile feedback at the second seat while the one or more speakers in the vehicle playback the audio output.

4. The apparatus of claim 3 further comprising an amplifier configured to:
receive the first control signal;
receive the second control signal;
transmit a third control signal indicative of the first desired tactile feedback to the first tactile transducer from a first output thereof in response to the first control signal; and
transmit a fourth control signal indicative of the second desired tactile feedback to the second tactile transducer from a second output thereof in response to the second control signal, wherein the first output is different than the second output to enable independent control for each of the first tactile transducer and the second tactile transducer.

5. The apparatus of claim 3 wherein the first desired tactile feedback is different than the second desired tactile feedback.

6. The apparatus of claim 3 wherein the first desired tactile feedback corresponds to a first desired amount of vibrations for a predetermined frequency range of the audio output and wherein the second desired tactile feedback corresponds to a second desired amount of vibrations for the predetermined frequency range of the audio output, wherein the first desired amount of vibrations is different than the second desired amount of vibrations.

7. The apparatus of claim 6 wherein the predetermined frequency range corresponds to 20-70 Hz.

8. The apparatus of claim 1 wherein the head unit is further configured to receive the first command from at least one of: (i) one or more physical knobs positioned proximate to any one seat in the vehicle, (ii) a mobile device, (iii) an individualized touch screen positioned proximate to the any one seat in the vehicle, and (iv) a user interface positioned on the head unit.

9. The apparatus of claim 1 wherein the head unit is further configured to receive a signal from an occupant sensor indicative of whether a vehicle occupant is positioned on the first seat.

10. The apparatus of claim 9 wherein the head unit is further configured to deactivate the first tactile transducer in response to the signal indicating that the vehicle occupant is not positioned in the first seat.

11. A computer-program product embodied in a non-transitory computer read-able medium that is programmed for providing a tactile output associated with an audio output with a plurality of tactile transducers, each tactile transducer being positioned in a seat of a vehicle, the computer-program product comprising instructions for:
receiving a first command indicative of a first desired tactile feedback for a first seat of the vehicle, the first desired tactile feedback being associated with an audio output that is played back by one or more speakers in the vehicle; and
transmitting a first control signal indicative of the first desired tactile feedback to be provided by a first tactile transducer in the first seat of the vehicle such that the first tactile transducer generates the first desired tactile feedback at the first seat while the one or more speakers in the vehicle playback the audio output.

12. The computer-program product of claim 11 further comprising instructions for receiving a second command indicative of a second desired tactile feedback for a second seat of the vehicle, the second desired tactile feedback being associated with the audio output that is played by the one or more speakers in the vehicle.

13. The computer-program product of claim 12 further comprising instructions for transmitting a second control signal indicative of the second desired tactile feedback to be provided by a second tactile transducer in the second seat of the vehicle such that the second tactile transducer generates the desired second tactile feedback at the second seat while the one or more speakers in the vehicle playback the audio output.

14. The computer-program product of claim 13 wherein the first desired tactile feedback is different than the second desired tactile feedback.

15. The computer-program product of claim 13 wherein the first desired tactile feedback corresponds to a first desired amount of vibrations for a predetermined frequency range of the audio output and wherein the second desired tactile feedback corresponds to a second desired amount of vibrations for the predetermined frequency range of the audio output, wherein the first desired amount of vibrations is different than the second desired amount of vibrations.

16. The computer-program product of claim 15 wherein the predetermined frequency range corresponds to 20-70 Hz.

17. The computer-program product of claim 11 further comprising instructions for receiving the command from at least one of: (i) one or more physical knobs positioned proximate to any one seat in the vehicle, (ii) a mobile device, and (iii) an individualized touch screen positioned proximate to the any one seat in the vehicle.

18. The computer-program product of claim 11 further comprising instructions for receiving a signal from an occupant sensor indicative of whether a vehicle occupant is positioned on the first seat.

19. The computer-program product of claim 18 further comprising instructions deactivating the tactile transducer in response to the signal indicating that the vehicle occupant is not positioned in the first seat.

20. An apparatus for providing a tactile output associated with an audio output, the apparatus comprising:
a tactile transducer configured to be positioned in a seat of a vehicle to provide a tactile feedback associated with an audio output that is played back by one or more speakers in the vehicle and to be operably coupled to a head unit that receives a command indicative of a desired tactile feedback for the seat and that transmits a control signal indicative of desired tactile feedback to be provided by the tactile transducer.

* * * * *